United States Patent
Ziauddin et al.

(10) Patent No.: US 11,414,970 B2
(45) Date of Patent: Aug. 16, 2022

(54) ACID STIMULATION METHODS

(71) Applicant: Schlumberger Technology Corporation, Sugar Land, TX (US)

(72) Inventors: Murtaza Ziauddin, Katy, TX (US); Kevin Di Filippo, Sugar Land, TX (US); Xuehao Tan, Sugar Land, TX (US); Kin Jin Ng, Stafford, TX (US); Yi Wang, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 200 days.

(21) Appl. No.: 16/619,972

(22) PCT Filed: Jun. 6, 2018

(86) PCT No.: PCT/US2018/036176
§ 371 (c)(1),
(2) Date: Dec. 6, 2019

(87) PCT Pub. No.: WO2018/226772
PCT Pub. Date: Dec. 13, 2018

(65) Prior Publication Data
US 2021/0079776 A1    Mar. 18, 2021

Related U.S. Application Data

(60) Provisional application No. 62/515,819, filed on Jun. 6, 2017.

(51) Int. Cl.
*E21B 43/25* (2006.01)
*E21B 43/27* (2006.01)
(Continued)

(52) U.S. Cl.
CPC .............. *E21B 43/25* (2013.01); *E21B 37/00* (2013.01); *E21B 37/06* (2013.01); *E21B 43/27* (2020.05);
(Continued)

(58) Field of Classification Search
CPC ........ E21B 37/00; E21B 37/06; E21B 463/25; E21B 463/27; E21B 2200/20
See application file for complete search history.

(56) References Cited

U.S. PATENT DOCUMENTS

2008/0015832 A1    1/2008  Tardy
2015/0285045 A1   10/2015  Ziauddin et al.
(Continued)

FOREIGN PATENT DOCUMENTS

EP    2192507 A1    6/2010
WO    2016195623 A1   12/2016

*Primary Examiner* — Tara Schimpf

(57) ABSTRACT

Matrix acidizing treatment are designed and performed in a manner that takes into account radial acid flow into the formation. Subterranean well characteristics are determined (e.g., mineralogical and petrophysical characteristics). One of more candidate acids is selected. A linear pore volume of acid to breakthrough (PVBT) curve is generated for each candidate acid. The linear PVBT curves are modified to account for radial acid flow. The optimal acid is selected by considering wormhole development and cost. An initial acid pumping schedule is generated for the formation to be acidized, including the optimal acid, the treatment volume and the injection rate. Computer software is used to consider the subterranean well characteristics, simulate the initial acid pumping schedule and compare results with the radial PVBT curve. The initial schedule is modified until the results are consistent with the radial PVBT curve. An acidizing treatment is then performed.

20 Claims, 4 Drawing Sheets

(51) Int. Cl.
  *E21B 49/00*  (2006.01)
  *G01V 99/00*  (2009.01)
  *E21B 37/06*  (2006.01)
  *E21B 37/00*  (2006.01)
  *E21B 47/07*  (2012.01)
  *E21B 47/10*  (2012.01)
  *G01V 3/32*  (2006.01)

(52) U.S. Cl.
  CPC ............ E21B 49/00 (2013.01); G01V 99/005 (2013.01); *E21B 47/07* (2020.05); *E21B 47/10* (2013.01); *E21B 2200/20* (2020.05); *G01V 3/32* (2013.01)

(56) References Cited

U.S. PATENT DOCUMENTS

| | | | |
|---|---|---|---|
| 2015/0345267 A1* | 12/2015 | Modavi | E21B 43/25 166/271 |
| 2016/0024914 A1* | 1/2016 | Ghommem | E21B 43/26 166/254.2 |
| 2017/0107796 A1 | 4/2017 | Karale et al. | |
| 2019/0040298 A1* | 2/2019 | Purdy | B01J 49/60 |

\* cited by examiner

ACID STIMULATION METHODS

CROSS-REFERENCE TO RELATED APPLICATION

This application is a nonprovisional application that claims the benefit of U.S. Provisional application No. 62/515,819, filed on Jun. 6, 2017, entitled "Acid Stimulation Modeling Technique."

BACKGROUND

The statements in this section merely provide background information related to the present disclosure and may not constitute prior art.

Exploring, drilling and completing hydrocarbon and other wells are generally complicated, time consuming and ultimately very expensive endeavors. As a result, oilfield efforts are often largely focused on techniques for maximizing recovery from each well. Whether the focus is on drilling, unique architecture, or step-by-step interventions directed at well fracturing, the techniques have become quite developed over the years. One such operation at the well site directed at enhancing hydrocarbon recovery from the well is referred to as a stimulation application.

Wellbore stimulation is a widely practiced treatment method to enhance the production of hydrocarbons from oil or gas wells traversing subterranean reservoirs by removing near-wellbore formation damage or by creating alternate flow paths through the formation. One type of stimulation is an acid stimulation in which a particular acid is directed into the well at a particular volume and rate depending on a host of factors such as formation type, temperature, etc. Acid stimulation may comprise injecting a stimulation fluid into an isolated treatment zone at pressures below the fracture pressure of the formation. In some instances, the injected fluid may extend the effective wellbore drainage radius by dissolving formation rock to form channels such as wormholes or remove formation damage induced during drilling operations. The purpose of such stimulation techniques is often to increase the production rate by increasing the near borehole equivalent permeability Designing an acid stimulation application may be a challenge. Which acid type is most effective, the rate of introduction and a host of other factors may be considered. Historical data documenting past efforts may be available. However, operators would often appreciate a well-specific set of criteria and information. For example, the possibility exists of designing and running an acid stimulation and performing a pressure build-up on the well to ascertain effectiveness of wormhole formation. However, such testing is expensive. Further, the information is obtained after performing the designed application.

A more cost effective approach to obtaining a visual model of stimulation design is to plot pore volume of acid to breakthrough against injection rates, with "breakthrough" being indicative of the desired wormhole forming. That is, with known porosity, formation type and other characteristics, a model may be constructed in which curves of different acid types illustrate how much acid is supplied before "breakthrough" is attained, depending on the injection rate of the acid. This breakthrough is the point at which pressure resistance to the stimulation fluid becomes substantially negligible due to the formation of channel-like wormhole(s) that allow for a more free flow of fluid. Unfortunately, while cost-effective, the resultant modeling may be lacking in accuracy. Specifically, the optimal injection rate may vary from the model because the model may employ a linear function. In reality, the acid behavior upon injection during stimulation is a radial dispersion that is largely unaccounted for by the known modeling techniques. As a result, operators may receive a potentially inaccurate assessment concerning the optimal injection rate when designing the stimulation application.

SUMMARY

The present disclosure provides techniques for providing acid stimulation models that present a radial breakthrough curve. That is, rather than relying on a linear pore volume to breakthrough (PVBT) curve plotted against velocity, a radial PVBT curve that accounts for radial flow due to targeted wormhole lengths may be generated and utilized by operators when designing specific acid stimulation applications.

In an aspect, embodiments relate to methods for acidizing a formation in a subterranean well. Subterranean well characteristics are determined, including subterranean well geometry, mineralogical characteristics and petrophysical characteristics. One or more candidate acids are selected, and linear PVBT curves are generated for each candidate acid. The linear PVBT curve is modified to account for radial acid flow through the formation. The optimal acid is then selected by considering wormhole development efficiency and cost. An initial acid pumping schedule is generated. The schedule includes the optimal acid, the treatment volume and the injection rate. Computer software is employed to consider the subterranean well characteristics, simulate the initial acid pumping schedule in the subterranean well and compare the results with the radial PVBT curve. The initial acid pumping schedule is modified such that the results are consistent with the radial PVBT curve. An acidizing treatment is then performed in the subterranean well and is monitored in real time.

In a further aspect, embodiments relate to methods for performing an acidizing treatment in a formation in a subterranean well. Subterranean well characteristics are determined, including subterranean well geometry, mineralogical characteristics and petrophysical characteristics. One or more candidate acids are selected, and linear PVBT curves are generated for each candidate acid. The linear PVBT curve is modified to account for radial acid flow through the formation. The optimal acid is then selected by considering wormhole development efficiency and cost. An initial acid pumping schedule is generated. The schedule includes the optimal acid, the treatment volume and the injection rate. Computer software is employed to consider the subterranean well characteristics, simulate the initial acid pumping schedule in the subterranean well and compare the results with the radial PVBT curve. The initial acid pumping schedule is modified such that the results are consistent with the radial PVBT curve. An acidizing treatment is then performed in the subterranean well and is monitored in real time.

DETAILED DESCRIPTION

Figure 1:
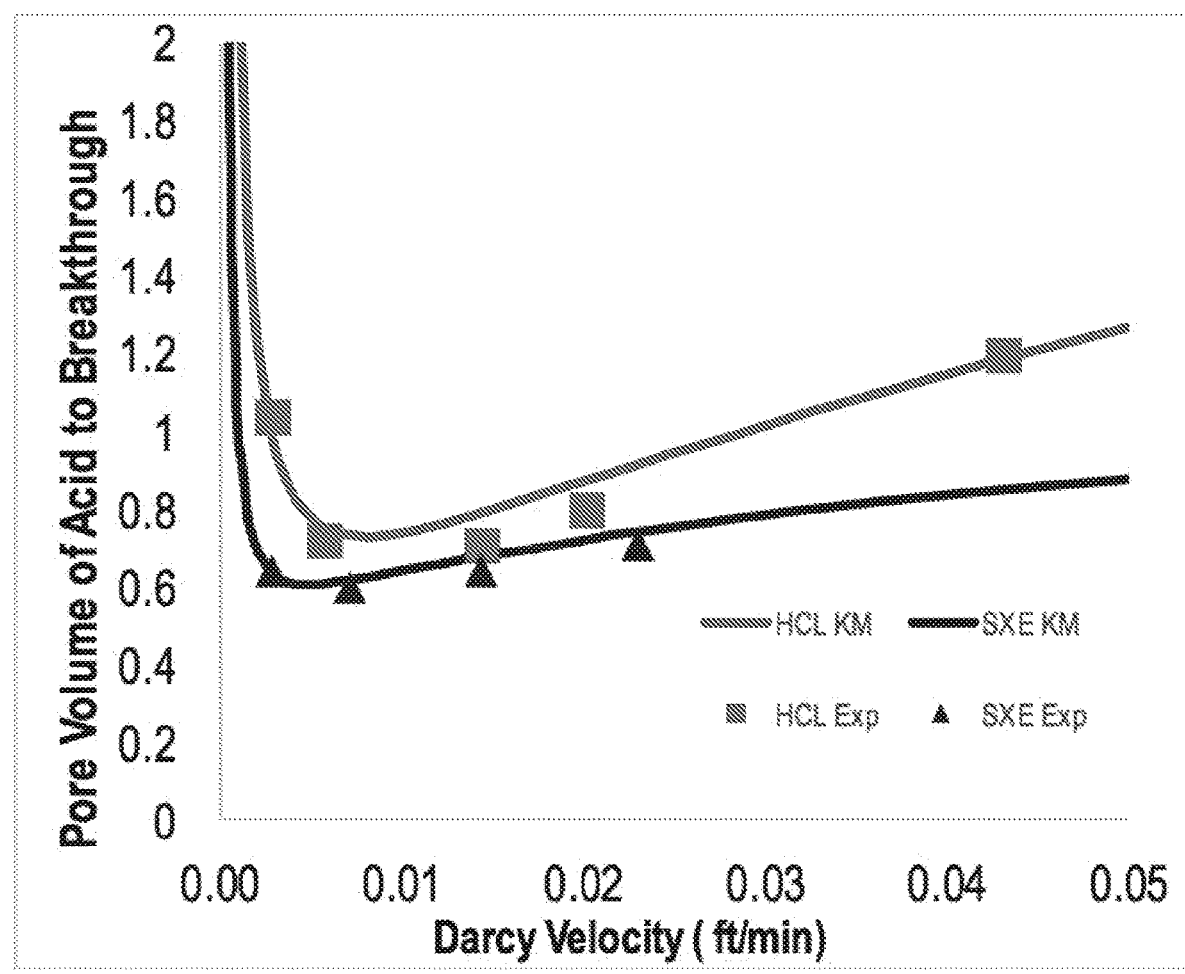
FIG. 1 presents linear PVBT curves for 15% hydrochloric acid (HCL) and 15% emulsified hydrochloric acid (SXE). The curves were generated from 65-mD carbonate cores. The test temperature was 150° F.

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation-specific decisions are made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the disclosure and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a concentration range listed or described as being useful, suitable, or the like, is intended that any concentration within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, even if specific data points within the range, or even no data points within the range, are explicitly identified or refer to a few specific, it is to be understood that inventors appreciate and understand that any data points within the range are to be considered to have been specified, and that inventors possessed knowledge of the entire range and the points within the range.

As used herein, "embodiments" refers to non-limiting examples disclosed herein, whether claimed or not, which may be employed or present alone or in any combination or permutation with one or more other embodiments. Each embodiment disclosed herein should be regarded both as an added feature to be used with one or more other embodiments, as well as an alternative to be used separately or in lieu of one or more other embodiments. It should be understood that no limitation of the scope of the claimed subject matter is thereby intended, any alterations and further modifications in the illustrated embodiments, and any further applications of the principles of the application as illustrated therein as would normally occur to one skilled in the art to which the disclosure relates are contemplated herein.

As used herein, the terms "treatment fluid," "acidizing fluid" or "wellbore treatment fluid" are inclusive of "stimulating treatment" and should be understood broadly. These may be or include a liquid, a foam, a solid, a gas, and combinations thereof, as will be appreciated by those skilled in the art. A treatment fluid may take the form of a solution, an emulsion, slurry, or any other form as will be appreciated by those skilled in the art. It should be understood that, although a substantial portion of the following detailed description may be provided in the context of acidizing operations, other oilfield operations such as cementing, gravel packing, etc., or even non-oilfield well treatment operations, can utilize and benefit as well from the disclosure of the present methods of formation treatment.

Moreover, the schematic illustrations and descriptions provided herein are understood to be examples only, and components and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

One of the goals of wellbore stimulation is to remove or bypass formation damage that may be present in the near-wellbore region of the formation by creating high-conductivity flow channels. During stimulation treatments in hydrocarbon reservoirs, injection conditions of treatment fluids may control the resulting dissolution patterns produced in the formation that may vary in structure from uniform, conical, and wormhole types as new channels are created. The shape and structure of these channels may depend on a number of factors, including the type of stimulating fluid, the injection rate, the concentration of the active species in the stimulation fluid, the chemical kinetics of the reaction between stimulation fluid and the formation, and the thickness and permeability of the damaged zone.

In an aspect, embodiments relate to methods for acidizing a formation in a subterranean well. Subterranean well characteristics are determined, including subterranean well geometry, mineralogical characteristics and petrophysical characteristics. One or more candidate acids are selected, and linear PVBT curves are generated for each candidate acid. The linear PVBT curve is modified to account for radial acid flow through the formation. The optimal acid is then selected by considering wormhole development efficiency and cost. An initial acid pumping schedule is generated. The schedule includes the optimal acid, the treatment volume and the injection rate. Computer software is employed to consider the subterranean well characteristics, simulate the initial acid pumping schedule in the subterranean well and compare the results with the radial PVBT curve. The initial acid pumping schedule is modified such that the results are consistent with the radial PVBT curve. An acidizing treatment is then performed in the subterranean well and is monitored in real time.

In a further aspect, embodiments relate to methods for performing an acidizing treatment in a formation in a subterranean well. Subterranean well characteristics are determined, including subterranean well geometry, mineralogical characteristics and petrophysical characteristics. One or more candidate acids are selected, and linear PVBT curves are generated for each candidate acid. The linear PVBT curve is modified to account for radial acid flow through the formation. The optimal acid is then selected by considering wormhole development efficiency and cost. An initial acid pumping schedule is generated. The schedule includes the optimal acid, the treatment volume and the injection rate. Computer software is employed to consider the subterranean well characteristics, simulate the initial acid pumping schedule in the subterranean well and compare the results with the radial PVBT curve. The initial acid pumping schedule is modified such that the results are consistent with the radial PVBT curve. An acidizing treatment is then performed in the subterranean well and is monitored in real time.

For any of the above aspects, the subterranean formation may comprise carbonate minerals. The carbonate minerals may comprise calcite, limestone and dolomite.

For any of the above aspects, the pumping schedule may be further adjusted according to the real time monitoring. In addition, an acidizing treatment may be performed in another subterranean formation with similar mineralogical and petrophysical characteristics, using the adjusted pumping schedule. The subterranean well geometry, mineralogical and petrophysical characteristics may be determined from well logs. The well logs may comprise nuclear magnetic resonance (NMR) logs, porosity logs, resistivity logs and elemental (ELAN) logs.

The petrophysical characteristics may include porosity and permeability. Another petrophysical parameter that may be useful during the design of formation stimulation treatments is pore-scale heterogeneity, the overall variance of the pore size distribution. Pore systems in formations and other porous media are made up of larger voids (pores), which may be interconnected by smaller voids (pore throats). Pore size is defined as the diameter of the largest sphere that can fit into a pore, while the pore throat size is defined as the diameter of the connections between the pores. Interparticle pore space may be visualized as rooms with connecting doors in which the "doors" represent the pore throats that connect the "rooms" or pores. Pore size may vary considerably depending on the type of formation, and even within a sample taken from a single formation. For example, carbonate formations may possess complex pore structure and exhibit multiporosity in which a single formation encompasses several pore types, e.g., interparticle porosity, microporosity, vuggy porosity, moldic porosity, etc., that are often categorized by size as micropores, mesopores, and macropores. Depending on the nature of the pore-scale heterogeneity of a given formation, the flow rate of treatment fluids through a formation at a given pressure can vary widely between well-connected pore systems and isolated pore systems with little pore-to-pore connectivity.

For any of the above aspects, the linear and radial PVBT curves may be determined from core-flow tests or computer simulations. Methods for producing radial PVBT curves are presented in U.S. Patent Application No. 2008/0015832 (Tardy), which is incorporated herein in its entirety.

For any of the above aspects, the optimal acid may comprise hydrochloric acid, emulsified hydrochloric acid, hydrofluoric acid, hydrobromic acid, formic acid, citric acid, chelating agents of combinations thereof. In one or more embodiments, the stimulating fluid may be an acid applied at a concentration that ranges from 5 to 28 percent by weight (wt %). However, one skilled in the art will appreciate this general range may be higher or lower in some embodiments depending on the chemistry of the stimulating fluid used (e.g., higher concentrations may be appropriate for weak acids or chelant-containing stimulating fluids).

Possible chelants suitable for the described methods may include, for example, EDTA (ethylenediamine tetraacetic acid), diethylenetriaminepentaacetic acid (DTPA), citric acid, nitrilotriacetic acid (NTA), ethylene glycol-bis(2-aminoethyl)-N,N,N',N'-tetraacetic acid (EGTA), 1,2-bis(o-aminophenoxy) ethane-N,N,N',N'-tetraaceticacid (BAPTA), cyclohexanediaminetetraacetic acid (CDTA), triethylenetetraaminehexaacetic acid (TTHA), N-(2-Hydroxyethyl)ethylenediamine-N,N',N'-triacetic acid (HEDTA), glutamic-N,N-diacetic acid (GLDA), ethylene-diamine tetra-methylene sulfonic acid (EDTMS), diethylene-triamine penta-methylene sulfonic acid (DETPMS), amino tri-methylene sulfonic acid (ATMS), ethylene-diamine tetra-methylene phosphonic acid (EDTMP), diethylene-triamine penta-methylene phosphonic acid (DETPMP), amino tri-methylene phosphonic acid (ATMP), and diethanolamine (DEA).

For any of the above aspects, the initial acid pumping schedule may further comprise the use of mechanical or chemical diversion techniques. Mechanical diversion techniques may include ball sealers and packers. Chemical diversion techniques may include the addition of particulate additives, foaming agents, and viscoelastic surfactants (VES) to the acid formulations. The VES may be cationic, anionic, nonionic or zwitterionic. Example VES systems for acid diversion include OILSEEKER™ and VISCOELASTIC DIVERTING AGENT (VDA), both available from Schlumberger.

For any of the above aspects, the acidizing treatment may be performed through coiled tubing.

For any of the above aspects, the real time monitoring may comprise monitoring temperature, sound and flow rates in the subterranean well.

For any of the above aspects, the subterranean well may comprise multiple zones to be acidized, wherein the multiple zones have different mineralogical and petrophysical characteristics.

Embodiments of the present disclosure may be summarized as follows.

A method for acidizing a formation in a subterranean well comprises
determining subterranean well characteristics, the characteristics comprising a subterranean well geometry, and mineralogical and petrophysical characteristics of the formation to be acidized;
selecting one or more candidate acids, and generating a linear pore volume of acid to breakthrough (PVBT) curve for each candidate acid;
modifying the linear PVBT curve to account for radial acid flow through the formation;
selecting an optimal acid by considering at least an efficiency of wormhole development and cost;
generating an initial acid pumping schedule for the formation to be acidized, wherein the schedule comprises the optimal acid, treatment volume and injection rate;
using computer software to consider the subterranean well characteristics, simulate the initial acid pumping schedule in the subterranean well and compare results with the radial PVBT curve;
modifying the initial acid pumping schedule such that the results are consistent with the radial PVBT curve; and
performing an acidizing treatment in the subterranean well and monitoring the treatment in real time.

A method for performing an acidizing treatment in a formation in a subterranean well comprises
determining subterranean well characteristics, the characteristics comprising a subterranean well geometry, and mineralogical and petrophysical characteristics of the formation to be acidized;
selecting one or more candidate acids, and generating a linear pore volume of acid to breakthrough (PVBT) curve for each candidate acid;

modifying the linear PVBT curve to account for radial acid flow through the formation;

selecting an optimal acid by considering at least an efficiency of wormhole development and cost;

generating an initial acid pumping schedule for the formation to be acidized, wherein the schedule comprises the optimal acid, treatment volume and injection rate;

using computer software to consider the subterranean well characteristics, simulate the initial acid pumping schedule in the subterranean well and compare results with the radial PVBT curve;

modifying the initial acid pumping schedule such that the results are consistent with the radial PVBT curve; and performing an acidizing treatment in the subterranean well and monitoring the treatment in real time.

The acidizing and treating methods may further comprise adjusting the pumping schedule according to the real time monitoring and performing an acidizing treatment in another subterranean formation with similar mineralogical and petrophysical characteristics, using the adjusted pumping schedule.

For both the acidizing and treating methods, the subterranean well geometry, and mineralogical and petrophysical characteristics of the formation may be determined from well logs. The well logs may comprise NMR logs, porosity logs, resistivity logs and elemental logs.

For both the acidizing and treating methods, the linear and radial PVBT curves may be determined from core flow tests or computer simulations.

For both the acidizing and treating methods, the optimal acid may comprise hydrochloric acid, emulsified hydrochloric acid, hydrofluoric acid, formic acid, citric acid, chelating agents, or combinations thereof.

For both the acidizing and treating methods, the initial acid pumping schedule may further comprise mechanical or chemical diversion techniques.

For both the acidizing and treating methods, the acidizing treatment may be performed through coiled tubing.

For both the acidizing and treating methods, the real time monitoring may comprise monitoring temperature, sound and flow rates in the subterranean well.

For both the acidizing and treating methods, the subterranean well may comprise multiple zones to be acidized, wherein the multiple zones have different mineralogical and petrophysical characteristics.

EXAMPLES

Example 1

FIG. 1 presents examples of linear PVBT curves, which depict the pore volume of acid to achieve breakthrough against Darcy velocity. Specifically, a formation defining a well may be of a given porosity. During a proposed stimulation application, a certain amount of acid may be directed at the formation until breakthrough is attained. As is evident from FIG. 1, the higher the velocity, the lower the acid volume to achieve breakthrough.

FIG. 1 shows linear PVBT curves for 15% hydrochloric acid and emulsified 15% hydrochloric acid versus Darcy velocity. The symbols depict laboratory measured values from core testing. The solid lines are from computer simulations. The plots show that, for the same acid and injection rate, the emulsified acid is more efficient.

Example 2

Figure 2:
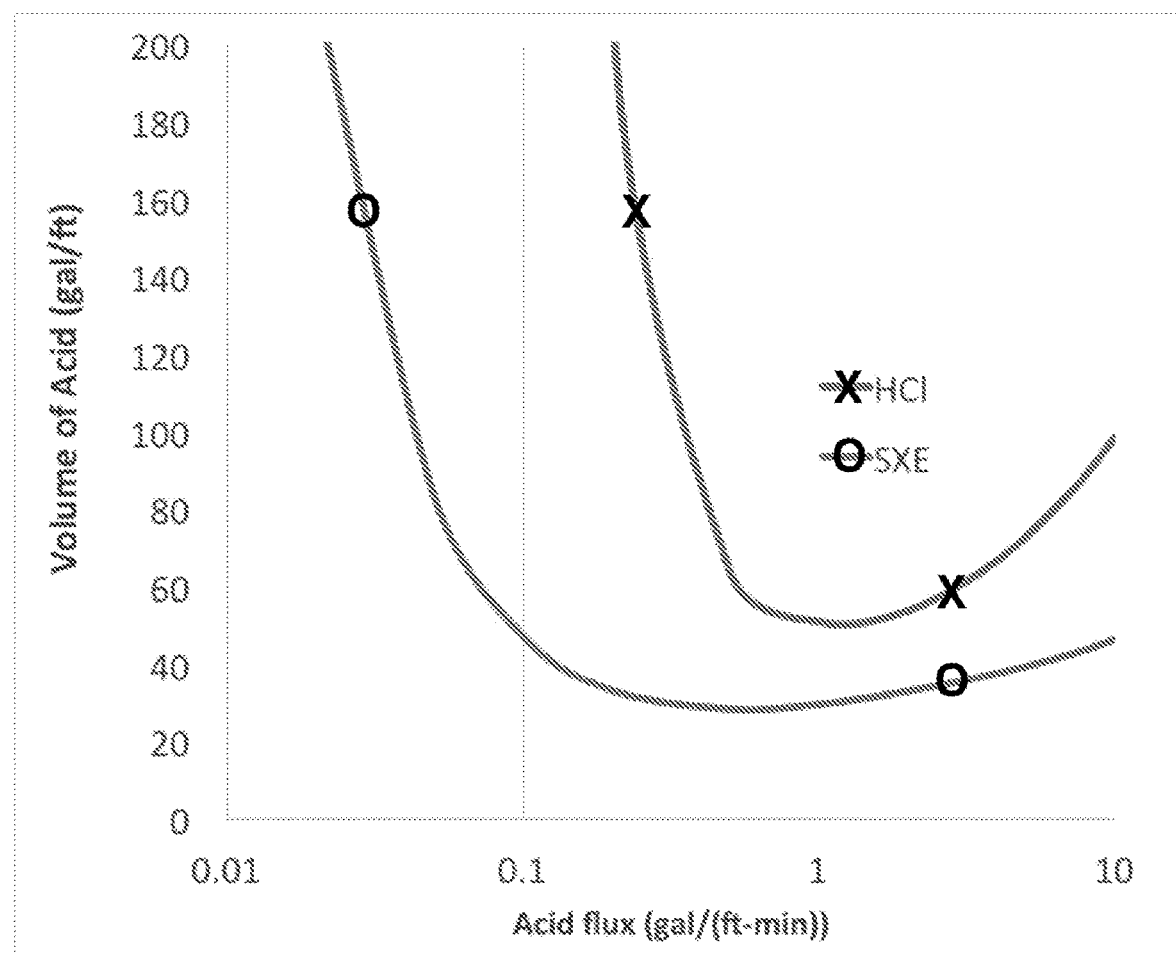
FIG. 2 presents radial PVBT curves that are based on the linear PVBT curves shown in FIG. 1.
Figure 3:
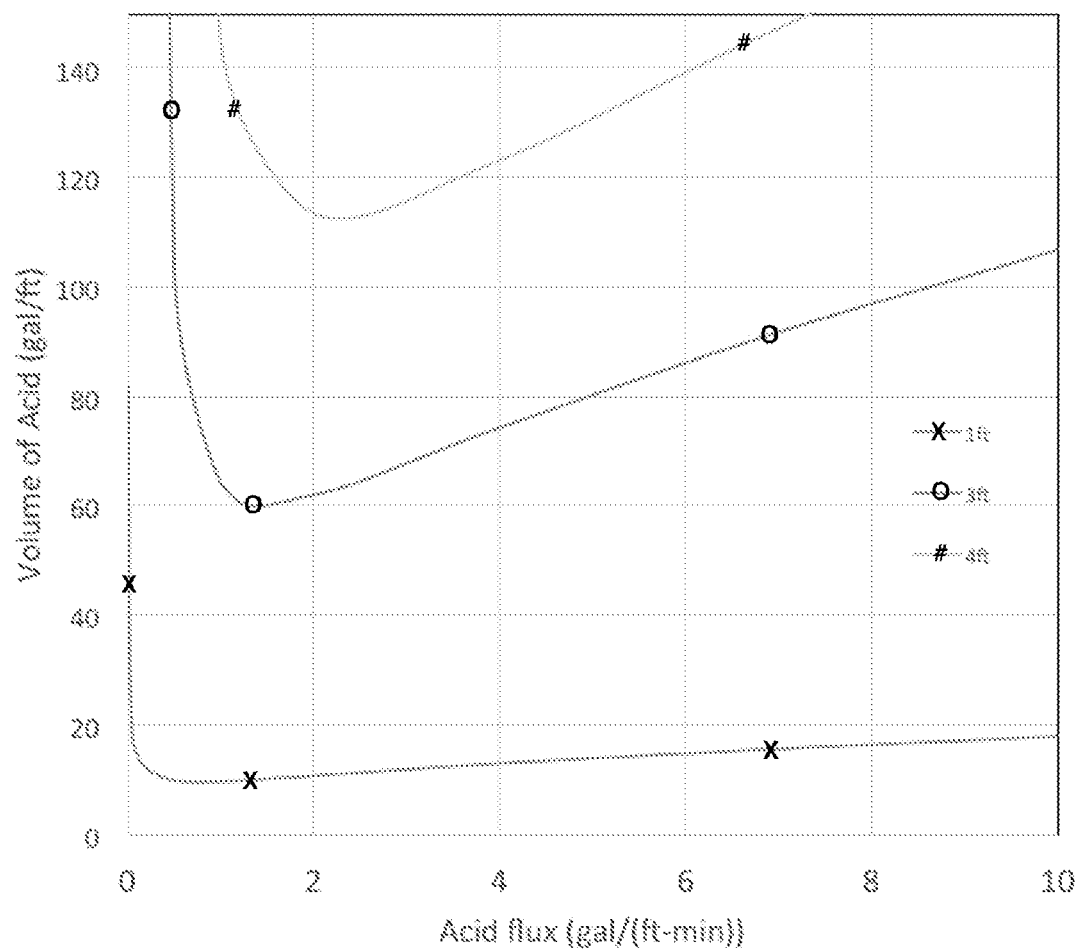
FIG. 3 presents radial PVBT curves for achieving wormhole penetrations of 1, 3 and 4 ft. The curves assume acid penetration through 100-mD carbonate cores at 150° F. The acid was 15% hydrochloric acid.

In FIG. 2, the behavior of the same acids employed in Example 1 is plotted with volume against an injection rate (e.g., acid flux). Specifically, the volume in gallons per foot is plotted against a rate that is provided in gallons per minute divided by feet. This chart is generated from the data curves of FIG. 1, but modified in that the wormhole length is taken into account. The linear PVBT curve has been converted to a radial PVBT curve by accounting for radial flow, acid spending and leak-off. In this case the wormhole length is 3 ft. Similar curves can be generated for different wormhole penetrations. For example, FIG. 3 shows the radial PVBT curve for HCl for 1, 3, and 4 ft wormhole penetration for 100 mD rock at 150° F.

Example 3

Figure 4:
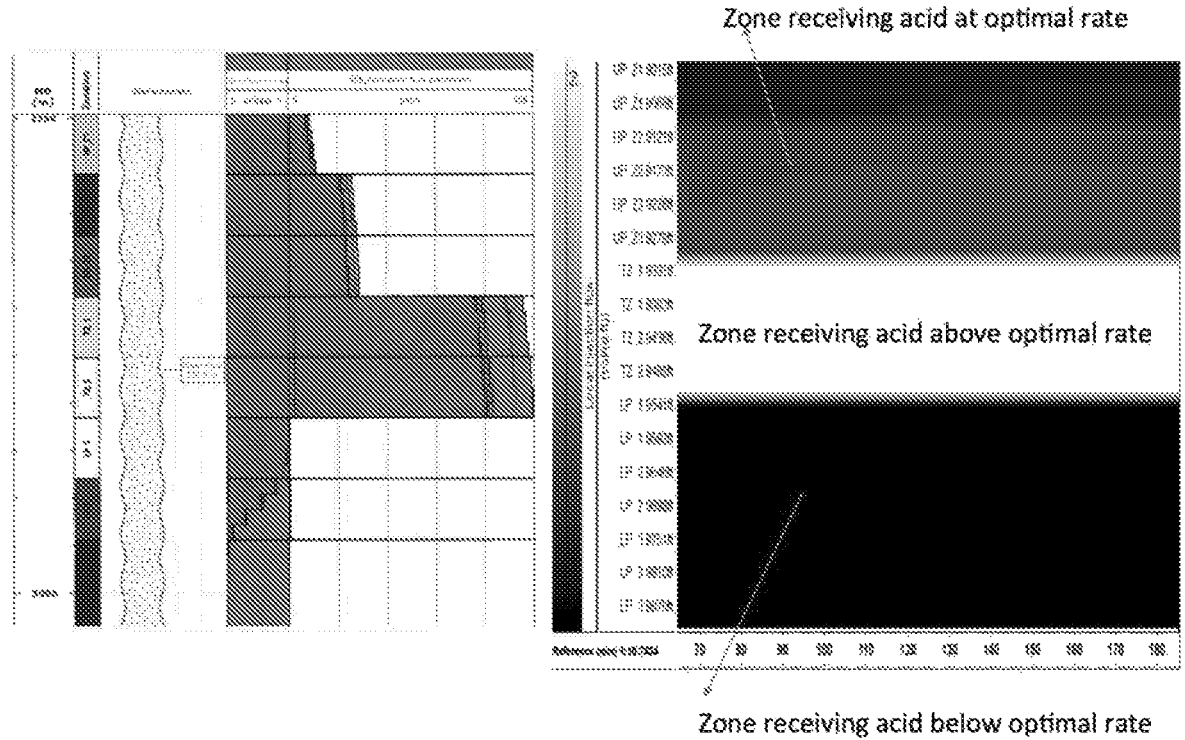
FIG. 4 presents an acid placement simulation covering intervals with various permeabilties.

When the interval to be acidized comprises multiple zones with different characteristics, the acid penetration into the formation may not be uniform. As shown in FIG. 4, it is apparent that acid penetration is greater near the middle zone, and more extended wormholes would be found. The zones above and below the middle zone received less acid, therefore, the penetration depth was shallower. Corrective action may be taken by adjusting the acid injection rate or including mechanical and chemical diversion techniques.

The preceding description has been presented with reference to present embodiments. Persons skilled in the art and technology to which this disclosure pertains will appreciate that alterations and changes in the described structures and methods of operation can be practiced without meaningfully departing from the principle, and scope of this present disclosure. Accordingly, the foregoing description should not be read as pertaining only to the precise structures described and shown in the accompanying drawings, but rather should be read as consistent with and as support for the following claims, which are to have their fullest and fairest scope.

What is claimed is:

1. A method for acidizing a formation in a subterranean well, comprising:

determining subterranean well characteristics, the characteristics comprising a subterranean well geometry, and mineralogical and petrophysical characteristics of the formation to be acidized;

selecting one or more candidate acids, and generating a linear pore volume of acid to breakthrough (PVBT) curve in a laboratory or by computer simulation for each candidate acid;

modifying the linear PVBT curve to account for radial acid flow through the formation;

selecting an optimal acid by considering at least an efficiency of wormhole development and cost;

generating an initial acid pumping schedule for the formation to be acidized, wherein the schedule comprises the optimal acid, treatment volume and injection rate;

using computer software to consider the subterranean well characteristics, simulate the initial acid pumping schedule in the subterranean well and compare simulation results with the radial PVBT curve;

modifying the initial acid pumping schedule such that the results are consistent with the radial PVBT curve; and after modifying the initial acid pumping schedule, performing an acidizing treatment in the subterranean well and monitoring the treatment in real time.

2. The method of claim 1, further comprising:

further adjusting the pumping schedule according to the real time monitoring; and performing an acidizing treatment in another subterranean formation with similar mineralogical and petrophysical characteristics, using the adjusted pumping schedule.

3. The method of claim 1, wherein the subterranean well geometry, and mineralogical and petrophysical characteristics of the formation are determined from well logs.

4. The method of claim 3, wherein the well logs comprise NMR logs, porosity logs, resistivity logs and elemental logs.

5. The method of claim 1, wherein the linear and radial PVBT curves are determined from core flow tests.

6. The method of claim 1, wherein the optimal acid comprises hydrochloric acid, emulsified hydrochloric acid, hydrofluoric acid, formic acid, citric acid, chelating agents, or combinations thereof.

7. The method of claim 1, wherein the initial acid pumping schedule further comprises mechanical or chemical diversion techniques.

8. The method of claim 1, wherein the acidizing treatment is performed through coiled tubing.

9. The method of claim 1, wherein the real time monitoring comprises monitoring temperature, sound and flow rates in the subterranean well.

10. The method of claim 1, wherein the subterranean well comprises multiple zones to be acidized, wherein the multiple zones have different mineralogical and petrophysical characteristics.

11. A method for treating a formation in a subterranean well, comprising:
  determining subterranean well characteristics, the characteristics comprising a subterranean well geometry, and mineralogical and petrophysical characteristics of the formation to be acidized;
  selecting one or more candidate acids, and generating a linear pore volume of acid to breakthrough (PVBT) curve in a laboratory for each candidate acid, wherein the one or more candidate acids are present at a concentration between 5% and 28% by weight;
  modifying the linear PVBT curve to account for radial acid flow through the formation;
  selecting an optimal acid by considering at least an efficiency of wormhole development and cost;
  generating an initial acid pumping schedule for the formation to be acidized, wherein the schedule comprises the optimal acid, treatment volume and injection rate;
  using computer software to consider the subterranean well characteristics, simulate the initial acid pumping schedule in the subterranean well and compare simulation results with the radial PVBT curve;
  modifying the initial acid pumping schedule such that the results are consistent with the radial PVBT curve; and
  after modifying the initial acid pumping schedule performing an acidizing treatment in the subterranean well and monitoring the treatment in real time.

12. The method of claim 11, further comprising:
  further adjusting the pumping schedule according to the real time monitoring; and
  performing an acidizing treatment in another subterranean formation with similar mineralogical and petrophysical characteristics, using the adjusted pumping schedule.

13. The method of claim 11, wherein the subterranean well geometry, and mineralogical and petrophysical characteristics of the formation are determined from well logs.

14. The method of claim 13, wherein the well logs comprise NMR logs, porosity logs, resistivity logs and elemental logs.

15. The method of claim 11, wherein the linear and radial PVBT curves are determined from core flow tests.

16. The method of claim 11, wherein the optimal acid comprises hydrochloric acid, emulsified hydrochloric acid, hydrofluoric acid, formic acid, citric acid, chelating agents, or combinations thereof.

17. The method of claim 11, wherein the initial acid pumping schedule further comprises mechanical or chemical diversion techniques.

18. The method of claim 11, wherein the acidizing treatment is performed through coiled tubing.

19. The method of claim 11, wherein the real time monitoring comprises monitoring temperature, sound and flow rates in the subterranean well.

20. The method of claim 11, wherein the subterranean well comprises multiple zones to be acidized, wherein the multiple zones have different mineralogical and petrophysical characteristics.

* * * * *